United States Patent

Kolkman

[11] Patent Number: 5,342,237
[45] Date of Patent: Aug. 30, 1994

[54] APPARATUS FOR DRESSING A SLAUGHTERED BIRD

[75] Inventor: Albert Kolkman, Oostzaan, Netherlands

[73] Assignee: Machinefabriek Meyn B.V., Oostzaan, Netherlands

[21] Appl. No.: 78,618

[22] Filed: Jun. 17, 1993

[30] Foreign Application Priority Data

Jun. 30, 1992 [NL] Netherlands ............... 9201167

[51] Int. Cl.⁵ ............................................. A22C 21/00
[52] U.S. Cl. .................................... 452/174; 452/176; 426/513
[58] Field of Search ............... 452/149, 174, 198, 176; 426/513; 119/97.1, 97.2

[56] References Cited

U.S. PATENT DOCUMENTS

| | | | |
|---|---|---|---|
| 1,980,904 | 11/1934 | Botz | 452/174 |
| 2,560,067 | 7/1951 | Bell | 452/174 |
| 3,082,475 | 3/1963 | Belknap | 452/174 |
| 3,188,212 | 6/1965 | Koonz et al. | 452/174 |
| 4,339,847 | 7/1982 | Niccolls | 452/174 |

FOREIGN PATENT DOCUMENTS

| | | |
|---|---|---|
| 2485336 | 12/1981 | France . |
| 2522475 | 9/1983 | France . |
| 1372985 | 11/1974 | United Kingdom . |

OTHER PUBLICATIONS

Foreign Search Report with translation.

*Primary Examiner*—Willis Little
*Attorney, Agent, or Firm*—Dority & Manning

[57] ABSTRACT

Apparatus for dressing a slaughtered bird, with cutting means for making cuts in the chest skin of the bird next to the thighs and with locating means for locating in these cuts the ends of the legs of the bird as defined by the hock joints. Preferably the locating means exist of means which are movable rectilinearly for bending the knees and which are rotatable for positioning the legs into the cuts. Further these means may carry the cutting means.

10 Claims, 2 Drawing Sheets

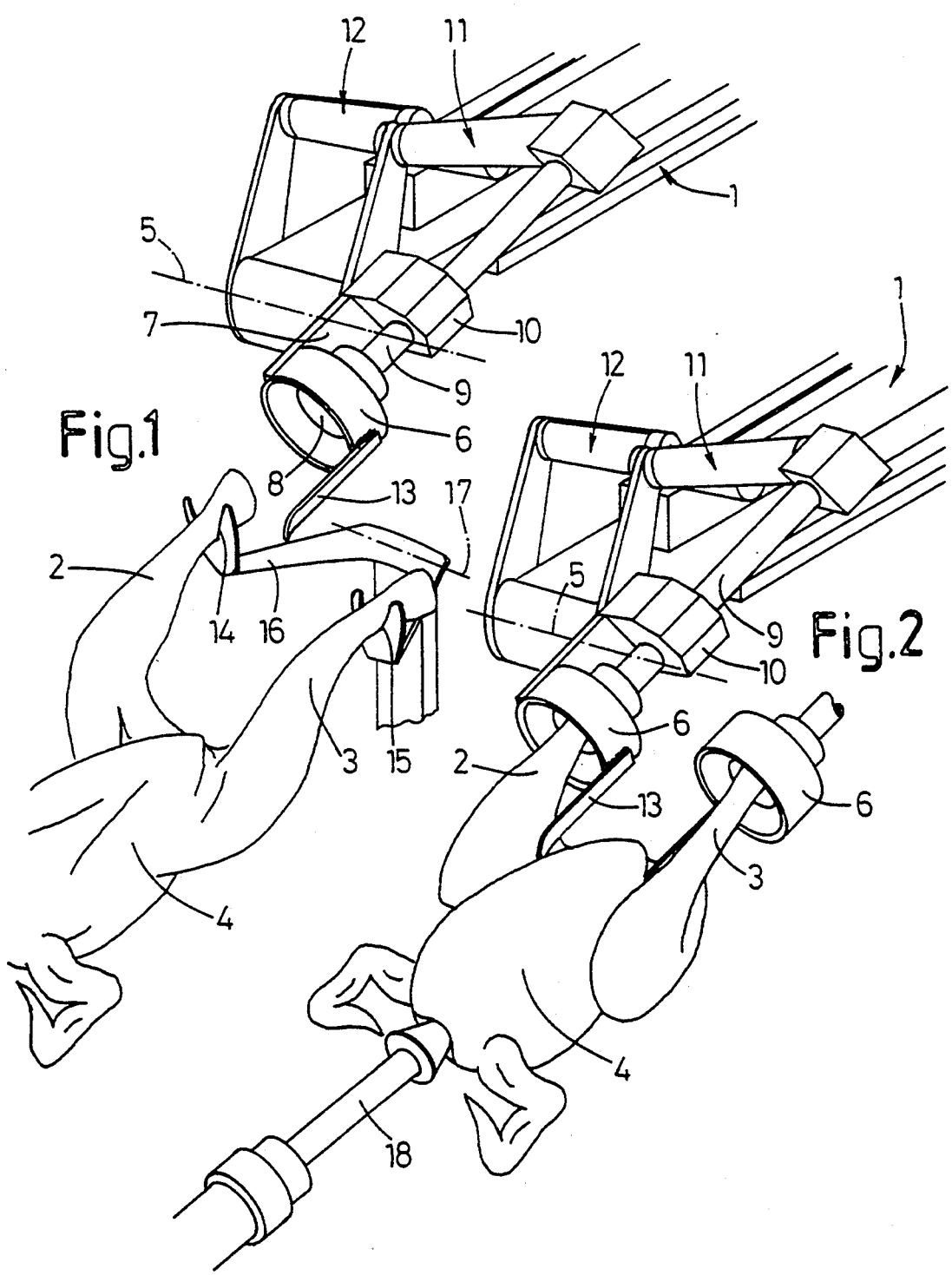

APPARATUS FOR DRESSING A SLAUGHTERED BIRD

BACKGROUND OF THE INVENTION

The invention relates to an apparatus for dressing a slaughtered bird.

In order to give slaughtered birds an attractive appearance they are "dressed", this means positioned in a special way and packed. This includes bringing the legs in a special position particularly close to the body of the bird. In a known method, the legs are tied up against the body of the bird or against each other.

Dutch patent application 80.03784 describes an apparatus in which the legs are forced through the peritoneum of the bird, thus obtaining the desired dressed condition of the bird.

OBJECTS AND SUMMARY OF THE INVENTION

It is an object of the invention to provide an apparatus for dressing a slaughtered bird operating in a simple, but nevertheless effective way. Additional objects and advantages of the invention will be set forth in the following description, or will be obvious therefrom, or may be learned by practice of the invention.

Thus the apparatus according to the invention is characterized by cutting means for making cuts in the chest skin of the bird next to the thighs and locating means for locating in these cuts the ends of the legs of the bird as defined by the hock joints.

When the cutting means have made the cuts in the chest skin of the bird and the hock joints of the bird have been positioned therein, the legs of the bird are close to the body of the bird, such that the bird obtains a desired dressed condition.

In a preferred embodiment of the apparatus according to the invention the locating means exist of means engaging the hock joints which are movable rectilinearly for bending the knees from an initially substantially stretched position, and which are rotatable around an axis transversally to their rectilinear direction of movement for positioning the hock joints into the cuts.

Because the locating means can move in two different ways, that is rectilinearly and rotatingly, it is possible to bring the legs, which initially are in a substantially stretched position, in a compact position by bending the knees and to successively position the ends of the legs as defined by the hock joints into the cuts made by the cutting means.

Further, it is advantageous if the cutting means are attached to the locating means and become operative through the rotation thereof. In this way, the cuts in the chest skin of the bird are provided automatically when the locating means rotate for successively positioning the hock joints into the cuts. Thus the rotation of the locating means directly leads to successively making the cuts and positioning therein of the hock joints.

Further, it is preferred that the locating means are provided with ejection means for transferring the hock joints of the bird from the locating means into the cuts. Using such ejection means positioning the hock joints in the cuts after the legs have been correctly positioned by the locating means may be simplified considerably.

In a preferred embodiment of the apparatus according to the invention, the locating means exist of sleeves which at least partially house the hock joints and which are provided with a movable bottom acting as ejection means. Initially, each ejection means is positioned in the respective sleeve such that this sleeve can engage around the respective hock joint and can bend the initially stretched leg. Then, after the locating means has been rotated, while at the same time making the cut in the chest skin, the ejection means is moved out of the sleeve thus transferring the respective hock joint from the sleeve into the cut.

Further it is handy if positioning means are applied for positioning the bird relative to the locating means and the cutting means. Using these positioning means, the apparatus can successively dress supplied birds in a reproducible way.

It is possible that the positioning means comprises a plate with recesses for receiving the legs of the bird. In this respect, it is advantageous if the plate is movable away from the legs after the locating means have engaged the hock joints.

In its starting position, the plate ensures a correct positioning of the legs relative to the locating means, which then can engage the hock joints. After this engagement has occurred, the plate is moved away from the legs, for example pivoted away, whereafter the locating means can carry out their rectilinear movement without being hindered by the plate.

Finally the positioning means can comprise means engaging the body of the bird for obtaining a further improvement of the positioning of the bird relative to the locating means and the cutting means.

Further, the invention may be characterized by an endless conveyor for the supply of birds to be dressed, which is provided with a large number of positioning means. By means of such an endless conveyor, dressing the supplied birds in the way described above can occur fully automatedly.

Hereinafter the invention will be elucidated further referring to the drawing, in which an embodiment of the apparatus according to the invention is illustrated.

BRIEF DESCRIPTION OF THE DRAWINGS

FIG. 1 shows, in part, a perspective view of an embodiment of the apparatus according to the invention in a starting position;

FIG. 2 shows the apparatus in a second position;

Figure 3:
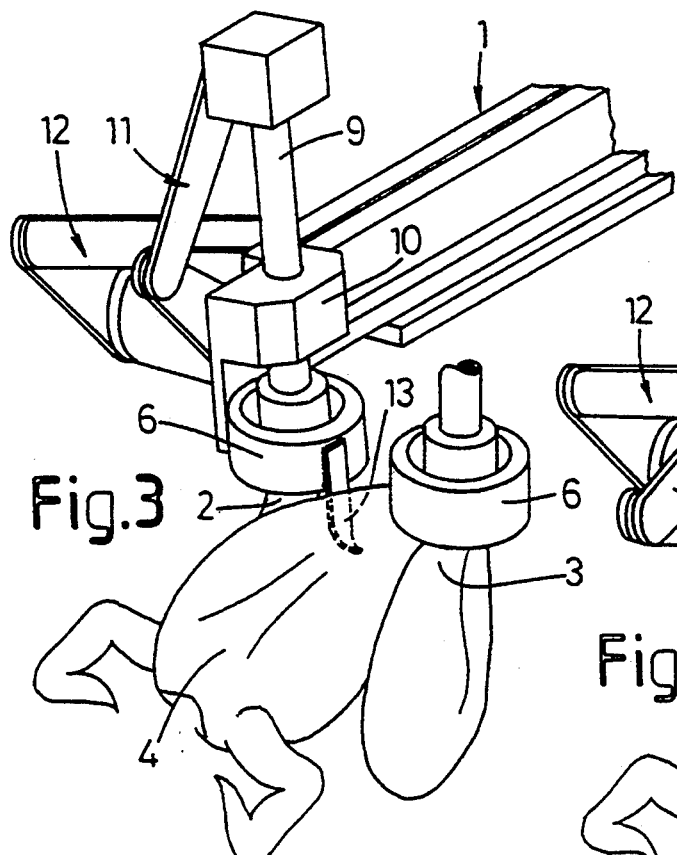
FIG. 3 shows the apparatus while making the cuts in the chest skin of the bird.

Reference will now be made in detail to the presently preferred embodiments of the invention, one or more example of which are illustrated in the drawings. The following description is provided by way of explanation of the invention, not limitation of the invention. For example, various modifications and variations can be made in the invention without departing from the scope or spirit of the invention. The numbering of 3 components is consistent throughout the description, with the same components having the same number.

DETAILED DESCRIPTION OF THE PREFERRED EMBODIMENTS

FIG. 1 shows a support arm 1 which is provided with activating means (not shown), for example rods, for cutting means, locating means and ejection means to be described later. It is noted that in FIG. 1 only one support arm 1 is illustrated, but that the apparatus comprises two symmetrically positioned support arms 1 which are meant for carrying out the dressing operation of both legs 2, 3 of a slaughtered bird 4.

At the foremost end of the support arm 1 (the end directed towards the bird 4), locating means are attached which are rotatable around a rotation axis 5 indicated schematically by a dotted line. These locating means comprise a sleeve 6 which, through a support plate 7, is connected with the rotation axis 5 and a bottom 8 positioned in the sleeve 6, the bottom being mounted on the end of a push rod 9. The push rod 9 is slidably provided in a guide block 10 which is also attached to the support plate 7. Through a shift of the push rod 9 relative to the guiding block 10, the bottom 8 can move relatively to the sleeve 6. In this manner, the bottom 8 operates as an ejection means, of which the function will be elucidated later.

The shift of the push rod 9 relative to the guiding block 10 and the sleeve 6 is caused by means of a transmission mechanism 11 which, in a way not shown further, is activated through activating means on the support arm 1. In a way also not shown further, the rotation of the locating means around the rotation axis is realized through the activating means on the support arm 1 and through a transmission mechanism 12. In this respect it is noted that a rotation of the locating means (this means essentially the sleeve 6 and the bottom 8) does not influence the position of the bottom 8 relative to the sleeve 6. An activation through the transmission mechanism 12, in principle, only leads to a rotation of the sleeve 6, the support plate 7, the bottom 8, the push rod 9, the guiding block 10 and the transmission mechanism 11. On the other hand, an activation of the transmission mechanism 11 only leads to a displacement of the bottom 8 with push rod 9 relative to the sleeve 6 without a rotation around the rotation axis 5 occurring.

Finally, through an appropriate shift of the support arm, or part thereof, the respective end of the support arm 1 can be moved rectilinearly in the direction of the bird 4, especially the legs 2, 3 thereof.

As clearly appears from FIG. 1, a knife 13 is attached to the outer side of the sleeve 6. This knife is provided at the side of the sleeve 6 directed towards the chest of the bird to be dressed.

The previously described assembly of support arm 1, locating means with operating means attached thereto, and knife 13 are meant for processing a leg 2 of the bird shown in FIG. 1. Correspondingly, a corresponding assembly (not shown) is provided near to leg 3, but it is shaped as a mirror image of the device shown.

Figure 5:
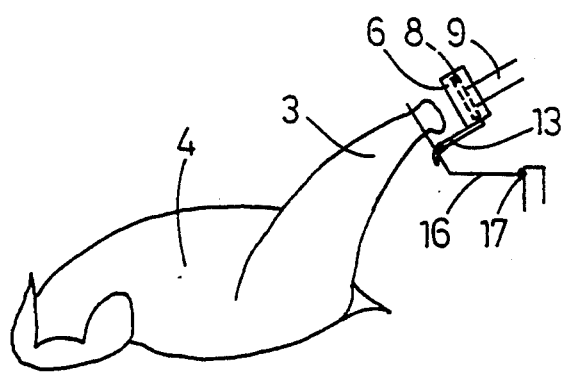
FIGS. 5-8 show schematic side elevational views corresponding with FIGS. 1-4 which clarify the operation carried out with the apparatus.

Further, FIG. 1 shows a forked plate 16 comprising two recesses 14 and 15. Rotatably around a horizontal axis 17 (see also FIG. 5), this plate 16 may be pivoted through a driving means not shown further. The recesses 14 and 15 are meant for receiving and positioning the legs 2, 3 of the bird 4, such that these are correctly positioned relative to the respective sleeves 6.

FIG. 2 further illustrates a positioning means 18 engaging the neck stub of the bird 4, which together with the plate 16 comprising the recesses 14 and 15 takes care of correctly positioning the bird 4 previous to and during engaging the legs 2, 3 with the locating means and knife 13.

It is noted that the positioning means 18 and the plate 16 may be provided on an endless conveyor for the supply of birds to be dressed, the conveyor carrying such a positioning means and such a plate for each bird to be processed. The conveyor supplies the birds to be processed in succession whereafter the respective dressing operation may occur.

Figure 7:
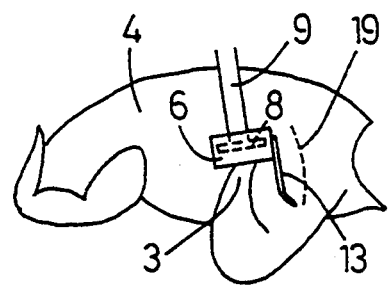
Figure 8:
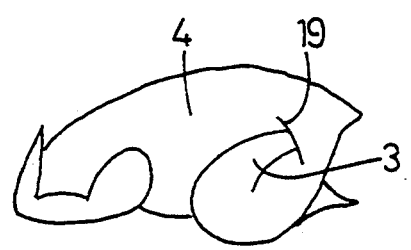

The apparatus operates as follows:

In FIG. 1 the situation is indicated in which the bird 4 to be processed is positioned correctly through the positioning means 18 and the plate 16. The legs 2, 3 are received in the recesses 14 and 15 of the plate, essentially aligned with the respective sleeve 6. This situation is also schematically indicated in FIG. 5, except that the situation with respect to the other leg 3 of the bird 4 is illustrated. This applies too for FIGS. 6, 7 and 8 to be discussed hereinafter, which correspond with FIG. 2, 3 and 4.

Next, through a movement of the arm 1 the locating means, especially the sleeve 6 (and all parts connected therewith), are moved towards the leg 2 which initially assumes a substantially stretched position, such that the sleeve 6 will engage around the end of the leg 2 (namely the hock joint thereof). As a result of an ongoing rectilinear movement of the sleeve 6, the knee of the leg 2 is bent until the bent position of the respective leg illustrated in FIG. 2 and FIG. 6 is reached.

The plate 16 is pivoted away from the legs 2, 3 after the sleeve 6 is engaged around the leg and before the bending of the knees occurs, such that it does not obstruct the rectilinear movement of the sleeve 6. The positioning means 18 however continues to support and hold the bird.

Figure 6:
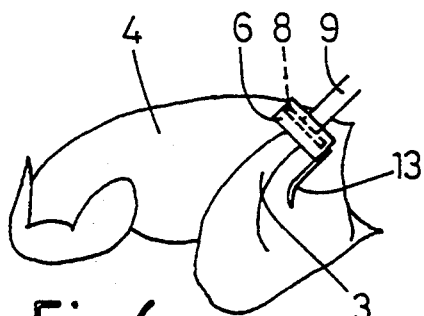

From the position shown in FIG. 2 and FIG. 6 a rotation of the locating means around the axis 5 is caused through an activation via the transmission mechanism 12. Then the knife 13, which is located at the side directed towards the chest of the bird, will make a cut in the chest skin next to the thigh, as has been indicated schematically by a dotted line 19 in FIG. 7. In FIG. 3 the apparatus is shown at a moment where making the cut 19 has almost been completed.

It is noted that, starting from the position shown in FIG. 1 until reaching the position shown in FIG. 3, the position of the bottom 8 relative to the sleeve 6 is not changed. However, after the cut 19 is made the push rod 9 is shifted relative to the guiding block 10 through the transmission mechanism 11, and thus the bottom 8 is shifted relative to the sleeve 6. This motion is directed such that the end of the respective leg 2, 3 is pushed out of the sleeve 6 and into the created cut 19. Meanwhile the respective hock joint is pushed into the cut in correspondence with FIG. 4 and FIG. 8, such that the bird obtains the desired dressed configuration.

Next, all the parts of the apparatus can be returned to the starting position, whereafter the conveyor may take away the bird and may position a new bird relative to the apparatus.

Figure 4:
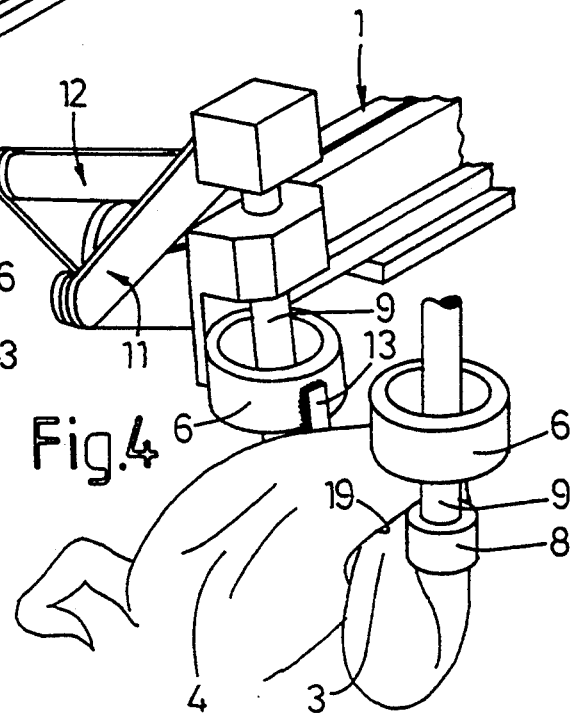
FIG. 4 shows the apparatus after the ends of the legs have been positioned in the cuts.

Causing the rectilinear movement of the sleeve from the position shown in FIG. 1 towards the position shown in FIG. 2, of the rotation of the locating means from the position shown in FIG. 2 towards the position shown in FIG. 3, and of pushing the legs out of the sleeve and into the cut from the position shown in FIG. 3 towards the position shown in FIG. 4, may occur in many ways, such as with the use of transmission mechanisms 11 and 12. In this aspect it is possible that all the driving motions are caused by one single driving means, such as a cylinder-piston assembly, which through appropriate abutment means respectively causes the proper succession of all the required movements.

The invention is not limited to the embodiment described before, which may be varied widely within the scope of the invention. In fact, various modifications and variations can be made in the invention without departing from the scope or spirit of the invention. For example, features of one embodiment can be used on another embodiment to yield a still further embodiment. It is intended that the present invention cover such modifications and variations and come within the scope of the appended claims and their equivalents.

I claim:

1. An apparatus for dressing a slaughtered bird, said apparatus comprising an actuable cutting device configured for making cuts in the chest skin of a slaughtered bird, and an actuable locating device in operable configuration with said cutting device, said locating device configured to engage the leg of the slaughtered bird and to move the hock joint of the leg into the cut made by said cutting device.

2. The apparatus as in claim 1, wherein said locating device comprises a hock joint engaging member, said engaging member being movable rectilinearly and rotatable about an axis transverse to its rectilinear path for bending the leg from an initially stretched position and pushing the hock joint into the cut made by said cutting device.

3. The apparatus as in claim 2, wherein said cutting device is mounted on said locating device, said cutting device mounted at such an aspect relative said locating device so that said cutting device makes a cut in the chest skin during rotation of said locating device.

4. The apparatus as in claim 3, wherein said cutting device comprises a knife blade, said knife blade attached to said locating device at the side thereof adjacent the chest of the slaughtered bird.

5. The apparatus as in claim 2, wherein said locating device comprises a sleeve generally around said hock joint engaging member, said hock joint engaging member being displaceable relative said sleeve for pushing the hock joint into the cut made by said cutting device.

6. The apparatus as in claim 1, further comprising an actuable positioning device, said positioning device operably configured to position the slaughtered bird relative to said cutting device and said locating device.

7. The apparatus as in claim 6, wherein said positioning device comprises a plate having defined recesses for receiving the legs of the slaughtered bird.

8. The apparatus as in claim 7, wherein said plate is movable away from the legs of the slaughtered bird after said locating device has engaged said legs.

9. The apparatus as in claim 8, wherein said positioning device further comprises a body engaging member configured to hold the body of the slaughtered bird relative said plate.

10. The apparatus as in claim 6, further comprising an endless conveyor device, wherein a plurality of said positioning devices are configured with said endless conveyor for supplying slaughtered birds to said locating device and said cutting device.

* * * * *